United States Patent
Balinsky et al.

(10) Patent No.: US 8,429,524 B2
(45) Date of Patent: Apr. 23, 2013

(54) DOCUMENT GENERATION AND REPURPOSING BASED ON VISUAL HIERARCHICAL SCORES OF PROPERTIES IN DOCUMENTS

(75) Inventors: Helen Balinsky, Cardiff Wales (GB); Al-Fathiatul Habibah Abdul-Rahman, Bristol (GB); Anthony Wiley, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 565 days.

(21) Appl. No.: 12/362,726

(22) Filed: Jan. 30, 2009

(65) Prior Publication Data
US 2010/0199168 A1 Aug. 5, 2010

(51) Int. Cl.
*G06F 17/00* (2006.01)
(52) U.S. Cl.
USPC ........... 715/249; 715/254; 715/234; 715/235; 715/236
(58) Field of Classification Search .................. 715/234, 715/249, 236, 235, 254
See application file for complete search history.

(56) References Cited

U.S. PATENT DOCUMENTS

| | | | |
|---|---|---|---|
| 6,240,407 B1 * | 5/2001 | Chang et al. ................. | 707/711 |
| 7,721,105 B1 * | 5/2010 | Herbach ...................... | 713/176 |
| 2003/0115551 A1 * | 6/2003 | Deleeuw ...................... | 715/527 |
| 2005/0108636 A1 * | 5/2005 | Sylthe et al. ................. | 715/525 |
| 2006/0155699 A1 * | 7/2006 | Purvis et al. ................... | 707/6 |
| 2007/0192687 A1 * | 8/2007 | Simard et al. ................ | 715/523 |
| 2007/0208996 A1 * | 9/2007 | Berkner et al. .............. | 715/521 |
| 2008/0037873 A1 * | 2/2008 | Berkner et al. .............. | 382/176 |
| 2008/0189600 A1 * | 8/2008 | Lau et al. ..................... | 715/235 |

\* cited by examiner

*Primary Examiner* — Doug Hutton, Jr.
*Assistant Examiner* — Andrew McIntosh

(57) ABSTRACT

A method executed by a computer of generating a repurposed document includes: providing a representation of a first document with no explicitly defined structure, extracting structural information for the first document using a set of predefined rules, determining a first content item formatted using a first style of the first document using the structural information, applying a second style to the first content item in order to generate a second content item, and generating the repurposed document using the second content item, wherein a visual significance hierarchical score is maintained between the first and second content items.

15 Claims, 10 Drawing Sheets

101

Endless Documents: A Publication as a Continual Function

| John Lumley | Roger Gimson | Owen Rees |
| Hewlett-Packard Laboratories | Hewlett-Packard Laboratories | Hewlett-Packard Laboratories |
| Filton Road, Stoke Gifford | Filton Road, Stoke Gifford | Filton Road, Stoke Gifford |
| BRISTOL BS34 8QZ, U.K. | BRISTOL BS34 8QZ, U.K. | BRISTOL BS34 8QZ, U.K. |
| john.lumley@hp.com | roger.gimson@hp.com | owen.rees@hp.com |

ABSTRACT

Variable data documents can be considered as functions of their bindings to values. The Document Description Framework (DDF) treats documents in this manner, using XSLT semantics to describe document functionality and a variety of related mechanisms to support layout, reference and so forth. But the result of evaluation of a function could itself be a function: can variable data documents behave likewise? We show that documents can be treated as simple *continuations* within that framework with minor modifications. We demonstrate this on a perpetual diary.

Categories and Subject Descriptors

I.7.2[Computing Methodologies]: Document Preparation — *desktop publishing, format and notation, languages and systems, markup languages, scripting languages*

General Terms: Languages

Keywords: XSLT, SVG, Document construction, Functional programming

1. INTRODUCTION & MOTIVATION

The *Document Description Framework*[1] (DDF), is an architecture for variable content documents based on separation of data, logical structure and presentation, and a view of the document as an extensible function. Using an XML tree as the main syntactic representation, constructional semantics are supported by sections of XSLT and an SVG-based geometric presentation by a hierarchical tree of layout instructions[2]. A suite of support tools implements the evaluation of such sets of such documents on variable bindings, managing the creation, merging, binding, evaluation and observation of the results into final printable forms, such as PDF.

tinue and grow as new information is added, *but for which it is meaningful, and useful, to observe its presentation content at stages during its binding 'life'*. Examples of such documents are:

- A diary where entries are added in a sequential order and where the bulk, but not all, of the new data appears at the 'end' of the major sequence.

- A patient's simple medical record. As new data is added, from a variety of sources, content can be added at several parts of the document. For example a temperature reading may add to a chart *and* a table. Lab tests might add both a complete new page and an additional entry in an earlier summary table.

We built such a document within our framework, specifically one for which presentation is generated at each stage of data binding *only* on the consequences of the new data. To put it differently, we build as much of the document 'presentation' (including layout) as possible, as early as possible, leaving large sections that will remain invariant for the remainder of the lifetime of the document, including the binding of 'new' data. In this paper we report on how we can define and process a document which *can be continual*.

We use the term 'continuation' loosely here, to describe both an indication that variable data is 'to be continued..' and also program sections that support the continual functionality.

2. A DOCUMENT WITH 'CONTINUATIONS'

Our challenge is to define a document which is even *capable* of accreting new information and adding to its display at each subsequent step of data binding, and ensure that the processing machinery can evaluate this correctly. We made experimental design choices which will restrict the types of document definable:

- 'Continuation' is indicated actively in the binding of data (by

Endless Documents: A Publication as a Continual Function

| John Lumley | Roger Gimson | Owen Rees |
|---|---|---|
| Hewlett-Packard Laboratories<br>Filton Road, Stoke Gifford<br>BRISTOL BS34 8QZ, U.K.<br>john.lumley@hp.com | Hewlett-Packard Laboratories<br>Filton Road, Stoke Gifford<br>BRISTOL BS34 8QZ, U.K.<br>roger.gimson@hp.com | Hewlett-Packard Laboratories<br>Filton Road, Stoke Gifford<br>BRISTOL BS34 8QZ, U.K.<br>owen.rees@hp.com |

ABSTRACT

Variable data documents can be considered as functions of their bindings to values. The Document Description Framework (DDF) treats documents in this manner, using XSLT semantics to describe document functionality and a variety of related mechanisms to support layout, reference and so forth. But the result of evaluation of a function could itself be a function: can variable data documents behave likewise? We show that documents can be treated as simple *continuations* within that framework with minor modifications. We demonstrate this on a perpetual diary.

Categories and Subject Descriptors

I.7.2[Computing Methodologies]: Document Preparation — *desktop publishing, format and notation, languages and systems, markup languages, scripting languages*

General Terms: Languages

Keywords: XSLT, SVG, Document construction, Functional programming

1. INTRODUCTION & MOTIVATION

The *Document Description Framework*[1] (DDF), is an architecture for variable content documents based on separation of data, logical structure and presentation, and a view of the document as an extensible function. Using an XML tree as the main syntactic representation, constructional semantics are supported by sections of XSLT and an SVG-based geometric presentation by a hierarchical tree of layout instructions[2]. A suite of support tools implements the evaluation of such sets of such documents on variable bindings, managing the creation, merging, binding, evaluation and observation of the results into final printable forms, such as PDF.

tinue and grow as new information is added, *but for which it is meaningful, and useful, to observe its presentation content at stages during its binding 'life'*. Examples of such documents are:

- A diary where entries are added in a sequential order and where the bulk, but not all, of the new data appears at the 'end' of the major sequence.

- A patient's simple medical record. As new data is added, from a variety of sources, content can be added at several parts of the document. For example a temperature reading may add to a chart *and* a table. Lab tests might add both a complete new page and an additional entry in an earlier summary table.

We built such a document within our framework, specifically one for which presentation is generated at each stage of data binding *only* on the consequences of the new data. To put it differently, we build as much of the document 'presentation' (including layout) as possible, as early as possible, leaving large sections that will remain invariant for the remainder of the lifetime of the document, including the binding of 'new' data. In this paper we report on how we can define and process a document which *can be continual*.

We use the term 'continuation' loosely here, to describe both an indication that variable data is 'to be continued..' and also program sections that support the continual functionality.

2. A DOCUMENT WITH 'CONTINUATIONS'

Our challenge is to define a document which is even *capable* of accreting new information and adding to its display at each subsequent step of data binding, and ensure that the processing machinery can evaluate this correctly. We made experimental design choices which will restrict the types of document definable:

- 'Continuation' is indicated actively in the binding of data (by

FIGURE 3

This text is written And this one is in
in Verdana, 20 pt Courier New, 20 pt

Abstract ABSTRACT

DOCUMENT GENERATION AND REPURPOSING BASED ON VISUAL HIERARCHICAL SCORES OF PROPERTIES IN DOCUMENTS

BACKGROUND

A document generally has a structure associated with it which defines a layout for and visual characteristics of content items of the document. The structure can be explicitly defined and recorded using a machine readable language such as a markup language for example. Alternatively the structure may be implicit, or only partially explicit. That is to say, none, or only a portion of the structure of the content of the document is explicitly defined and recorded. The different visual cues present in a document—such as spatial intervals and positions, contrast in font families, sizes and weights—combine to form the document's visual hierarchy. This hierarchy is essential to the reader, allowing scanning and comprehension; in contrast, this information is often ignored by machine processing.

A document may be repurposed—that is, the layout and/or certain of the characteristics of the content items constituting the document may be altered (in order to provide a different look for example, or to tailor the document to a specific audience or for a particular use). Automatic repurposing is relatively straightforward when the content items the document comprises of have a well defined and explicitly recorded structure—in such cases automatic repurposing can occur using the recorded structure and the document content without intervention. However, for documents in which there exists no, or only a partial definition of the structure of content items from which the document is composed, automatic repurposing is a more difficult task which has not been addressed since it is not generally possible for a computer implemented system to correctly and consistently determine the elements which make up the document, the way in which they should be repurposed, and to maintain a visual significance or hierarchy between original and repurposed elements which correctly reflects the relative importance associated with those elements in the document.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein:

FIG. 1a is a schematic representation of the layout of a portion of a first document;

FIG. 3 shows content of the document of FIG. 1 partitioned according to an embodiment;

DETAILED DESCRIPTION

Figure 1B:
FIG. 1b is a schematic representation of the differences in aspect values between several different fonts.

FIG. 1 shows a portion of an exemplary first document 101 comprising content 103 formed from a set of content items (such as body text, headings, headers, footers, titles, graphic objects etc.) for the document. The content items are formatted according to a particular style for the document which defines the disposition and formatting of the content items. It will be appreciated that styles can vary widely between documents, despite the fact a majority of documents generally comprise a similar frequency and type of content items.

In the first document 101, the content is only implicitly (or at best, partially explicitly) defined such that there is little or no defined machine-readable structure associated with the document which can be used to determine the individual content items from which the document is composed, and their associated characteristics—that is to say, there is no, or only a partial definition associated with the document for mapping particular content into a particular formatting defined by the style for the document, and in particular, there is no (or minimal) computer-readable structure associated with the document; structural information is implicitly conveyed by the deployment of different fonts, colors, graphical objects and spacing for example.

In this regard, the problem of automatically repurposing the content 103 of the first document 101 using a formatting style which is different to the style originally associated with the first document in order to provide a new document with a second style is non-trivial.

According to some embodiments, an implementation for repurposing a first document can be divided into three stages: the extraction and deconstruction of the input document (or documents), the mapping of styles, and the reconstruction of the content with its mapped style. A style for repurposing the first document can be known, or can be determined from a second document.

According to some embodiments, a document repurposing system that can operate on non-structured or partially structured documents proceeds by satisfying, amongst others, the following axioms:

Axiom 1. [Equality relation] Any two blocks of text with identical style properties should be given the same property in the repurposed document.

Axiom 2. [Ordering relation] If characters in one block of text are more prominent than characters in another block, their assigned styles in the repurposed document should preserve this relation.

Axiom 3. [Proportionality relation] For any three blocks of text, if characters in two of the blocks appear visually closer to each other than to characters in the third block, this relation should be preserved.

The fact that two blocks of texts have the same visual appearance (properties) generally means that these two blocks are likely to be related: they might be siblings or might have the same level of importance for example. Such a relationship is generally to be preserved unless otherwise stated by a user or required by any partially available structural information for the document.

Figure 2:
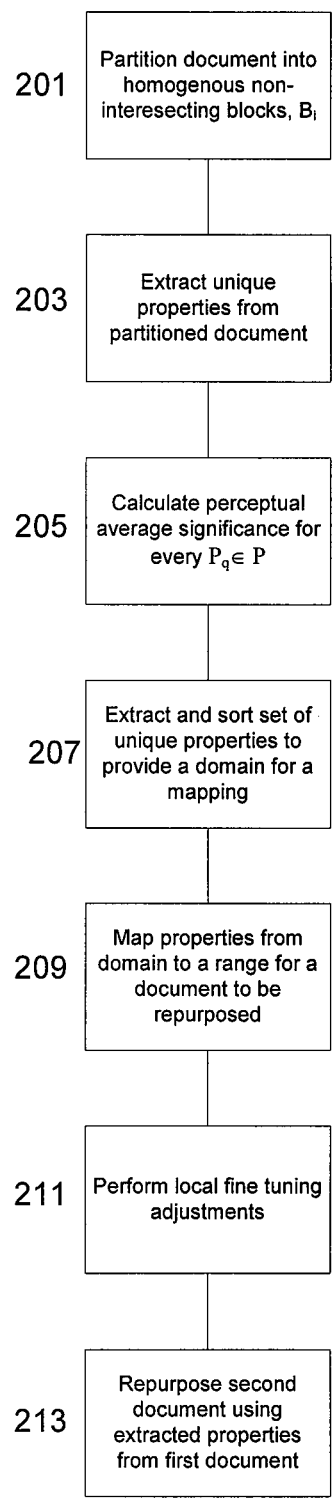
FIG. 2 is a flow chart for a method of generating a document according to an embodiment.

According to an embodiment, words can be formed from individual characters of the input document(s), then words can be joined into lines and lines into blocks of text using the strategy proposed in H. Chao and J. Fan, Layout and content extraction for pdf documents, In Lecture Notes in Computer Science, Document Analysis Systems VI, pages 213-224, Berlin/Heidelberg, 2004, Springer-Verlag, the contents of which are incorporated herein by reference. The general scheme is shown in FIG. 2. According to an embodiment, hierarchical scoring of properties can use the java.awt.Font and org.apache.fop.fonts.Font open source libraries to compute the required font metrics, which are available from corresponding font descriptor or font metric files (for example, .fon, .tff, .afm files).

The aspect value of a font as shown in FIG. 1$b$ is the ratio between font-size and its height such that aspect-value=x-height/font-size, where the height is a property of a font-family for any fixed font-size. Aspect value (to a certain degree of accuracy) is independent of font-size (at least for some font families in a certain range) and is a design attribute of a font-family. So, it is sufficient to establish corresponding aspect-value for each font family once and store them in a lookup table. Then for every given font-family and font-size the correspondent height of characters can be computed by reversing the above equation.

Referring to FIG. 2, at step 201 a first document (FIG. 1) is partitioned into a sequence of homogeneous non-intersecting blocks $B_i$ of characters that appear sequentially in the document and share the same font family, font size and variant (bold, italic, colour for example). The resultant partitioned document is shown diagrammatically in FIG. 3. FIG. 3 depicts blocks of homogeneous non-intersecting characters for the first document. The partitioning can proceed according to any number of known methods. For example, and according to an embodiment, the content can be appropriately partitioned according to the method outlined in H. Chao and J. Fan, Layout and content extraction for pdf documents, Lecture Notes in Computer Science, Document Analysis Systems VI, pages 213-224, Berlin/Heidelberg, 2004, Springer-Verlag, or alternatively as in J. Lumley, R. Gimson, and O. Rees, A framework for structure, layout & function in documents, DocEng '05: Proceedings of the 2005 ACM symposium on Document engineering, pages 3241, New York, N.Y., USA, 2005, the contents of both of which are incorporated herein by reference. Accordingly, in FIG. 3, blocks of non-intersecting homogenous text are depicted in respective boxes. For example, the title of the document of FIG. 3 is a block which a specific set of properties which define the font type, size and variant. The block of text for the title is within box 301. It will be appreciated that blocks according to an embodiment are blocks of characters, and that the bounding boxes of FIG. 3 are illustrative only of these distinct blocks of text rather than defining the exact location and boundaries of such blocks.

Each $B_i$ is a tuple containing a homogeneous piece of text $T_i$ and its associated properties: $P_i = \{f_i, s_i, v_i,\}$, where $f_i$, $s_i$ and $v_i$ are the font family, font size and variant (bold, italic, underscore, colour, etc.) respectively. By homogeneous we mean that all characters inside $B_i$ are of the same property $P_i$. We therefore have:

$B = \cup B_i$, (the overall text is the union of partitions)

$B_i = \{T_i, P_i\}$, $$T_i \cap T_k = \emptyset, \text{ if } i \neq k \qquad \text{Eqn. 1}$$

Any two adjacent blocks $B_i$ and $B_{i+1}$ differ by at least one of the properties, such that for any i, $P_i \neq P_{i+1}$. However, non-adjacent blocks may have the same properties such that for any i, k, where |i−k|>1, the equality $P_i = P_k$ is possible. An example of such a situation is where all section headings are bold and have the same font family and size.

At step 203, a set of all distinct non-repetitive combinations of properties in the document is extracted. That is to say, if we let $P = \{P_q\}$ be the non-repetitive set of all distinct combinations of properties in a particular document, then if $P_q \in P$ and $P_n \in P$, $P_q \neq P_n$.

At step 205 the perceptual average significance (hierarchical score) of characters is calculated/assigned for every $P_q \in P$. This score is designed to capture the relative location of the property in the document's visual hierarchy. The hierarchical score of a property is determined by contrasting its characteristics with those of other properties: comparative size and weight of their characters.

Figure 4:
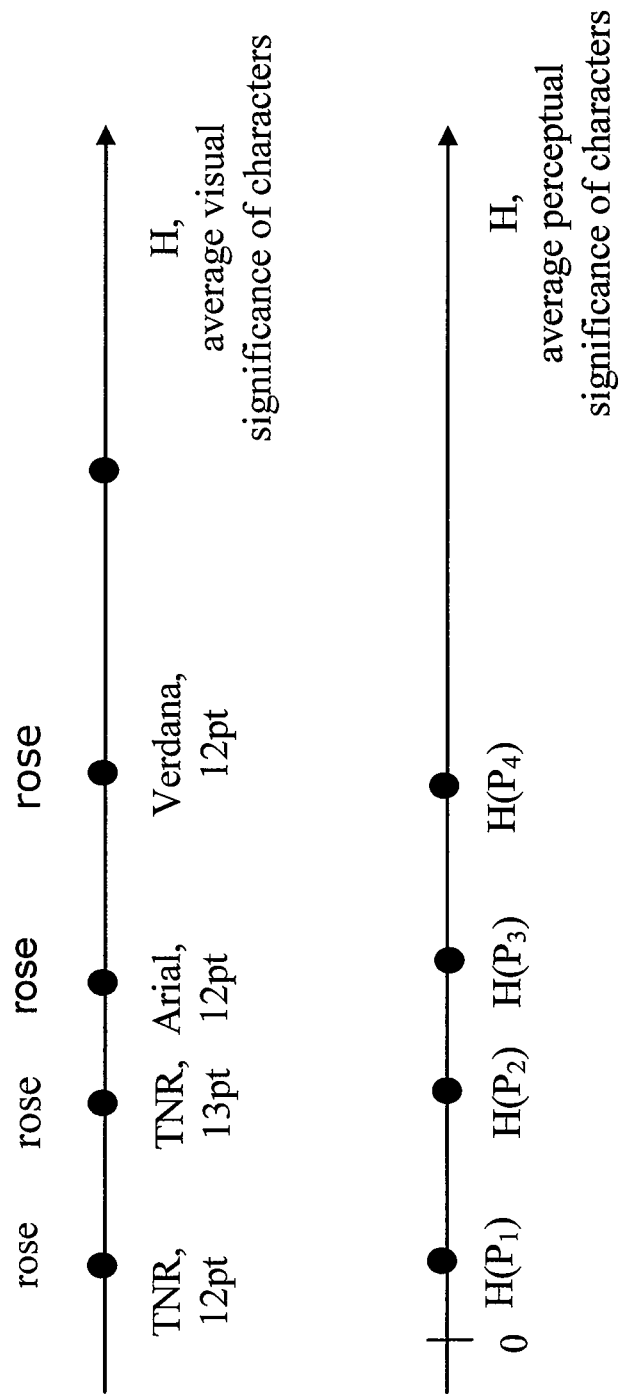
FIG. 4 is a schematic representation of the average visual and perceptual significance of characters according to an embodiment.

At step 207 a set of all unique (non-repetitve) properties $\{P_q\}$ is extracted. A perceptual significance/hierarchical score is assigned to each $P_q$: $h_q = H(P_q)$, where $h_q$ is a visual significance/perceptual hierarchical score assigned to the block(s) of text with property $P_q$. This value can be initially computed using the actual heights of characters in a particular font family, for a particular font size. Extra correction can be added to accommodate properties such as "bold", "all caps", etc. for example. Referring to FIG. 4 it can be seen that, for example:

$P_1 = \{$"Times New Roman", 12 pt, $\{$black$\}\}$;
$P_2 = \{$"Times New Roman", 13 pt, $\{$black$\}\}$;
$P_3 = \{$"Arial", 12 pt, $\{$red, bold$\}\}$;
$P_4 = \{$"Verdana", 12 pt, $\{$black, italic$\}\}$.

and that the visual significance/hierarchical dominance of the characters with corresponding properties can be ordered as: $P_1, P_2, P_3, P_4$ from the least dominant $P_1$ to the most dominant in this set, $P_4$. This order of dominance can be easily seen and recognized by humans. In order to make it recognizable by a machine/computer we need to assign hierarchical scores such that they reflect human perception.

In the example of FIG. 4, the perceptual significance/hierarchical score of the characters $H(P_i)$ can be ordered as:

$$H(P_1) < H(P_2) < H(P_3) < H(P_4)$$

Accordingly, there are some relationships for the same font family which can be easily determined, for example, the larger the font size, the more significance/higher hierarchical score is associated; adding "bold" or "all caps" will add more weight and should result in higher hierarchical score; "italic" adds less weight than "bold", etc. However, relationships between different font families might not be so straightforward. As a first approximation, one can take the average font heights and augment this with the corresponding variants (e.g., bold, italic and bright colour). For example, Verdana, 12 pt is visually "larger" than Times New Roman, 13 pt. According to an embodiment, it is sufficient to establish these relations between different font families only once and, for example, to speed up the repurposing tool a lookup table can be used to store these values.

The steps above generate an ordered list of average visual significance/perceptual hierarchical score for a first document. The domain values are the ordered values of average visual significances/hierarchical scores of properties for the first document. A second document has an associated ordered list of properties defining a range. This list for the second document can be a list which is predetermined and known, or one which has been determined using the method described above, but will generally be a list which comprises at least one property that is different than the list for the first document. The ordered list hierarchical scores for the second document defines a range of values. Different strategies can be deployed to establish a mapping M, which maps the properties of the first document to the content of the second document in a way which preserves the visual hierarchy of the properties associated with the content of the second document.

According to an embodiment, if the number of different properties in the range and domain are equal, then direct mapping can be used such that the i.sup.th property in the domain is mapped to the to $i^{th}$ property in the range. If either of the documents comprises an incomplete representation of its style (i.e. it does not contain every permitted property) or if the numbers of properties in the respective domain and range are different, a different approach can be used (for example a linear or piecewise-linear transformation can be applied as the mapping between the domain and the range). For the more generic situation in which the number of properties in the domain does not match the number in the range, a two step approach is implemented according to an embodiment (step 209):

1. Linear transformation to bring the domain and range values to the same scale;
2. Fine tuning of local adjustment transformation.

Using a linear transformation provides an intuitive initial mapping that preserves visual order and proportionality, i.e. adheres well to the above stated axioms. The transformation brings both the domain and range values into the same scale, whilst preserving perceptual order and proportionality between the different properties from domain. An alternative transformation may be used to take into account the amount of characters associated with some properties $P_q$.

According to an embodiment, an additional working hypothesis is that the most frequently occurring property $P_q$ is likely to be attributed to the main body in a document. Under certain circumstances a piece-wise linear transformation can be used to ensure that the most frequently occurring property in the domain is mapped to the most frequently occurring property in range. Other injective and preferably preserving order functions can be used. Some values obtained using such mappings (or similar) may be not be sufficiently close to the actual values in the range, thus requiring further local (fine-tuning) adjustment.

At step 211 local (fine-tuning) adjustments to the final formatting style are applied. Once the first level mapping M between the domain and range is completed, the final adjustment of the mapped values to the formatting style of the second document is carried out. A secondary adjustment F, can take the form $f_q=F(M(P_q))$. This is done to ensure that the final values $f_q$ are sufficiently closed to the values permitted (tolerated) by the original style of the second document.

According to an embodiment, a transformation proceeds by shifting $m_q=M(P_q)$ values to the nearest (either above or below) available values in the range, if such values are available. If the end style is not strict and there are not enough values in range, some extra values can be automatically added or at least suggested. Such suggestions can be approved by human interaction if desirable.

In some cases user interaction might be required. For example, if not enough values are provided and adding automatic values are not permitted (for example the original style of the second document is strict and all available properties are clearly stated). In this case, user guided merges can occur. Machine learning techniques can also be deployed to "remember" past user interactions to be used in the future. This case means that we repurpose the document whose style is richer than the final style and the final style is strict. In such circumstances inevitably some different properties should loose their distinction and become identical. For example, two nearest properties could be selected, but it could be a 'creative decision'.

Other adjustments can also be made based on:
the frequencies associated with each property $P_q$, to ensure titles and subtitles (which are low frequency properties) are mapped into low frequency sequential property;
sizes of $T_i$, text blocks associated with each $P_q$;
positions of $T_i$ (title, header, footer, etc.), alignment, spacings, special characters for lists, etc.;
any partial structural information (for example, tables);
any document/style related statistical data (for example, amount of pages);
any past user decisions from similar situations.

At step 213 the first document is reflowed using the extracted and assigned properties from the second document. The final mapping should match as accurately as possible the properties provided by the original style of the second document and at the same time adhere to axioms described above. At the same time two blocks having different appearances are indicative of either an unrelated nature between the blocks or different levels of importance, and this relationship is also preserved.

A prime factor in asserting a dominant position for a block of text within a design is the use of contrast in properties: larger, bolder characters will assume the dominant role. The subjective apparent size of text is affected by the perceived height of letters in a block. In turn, perceived height depends on multiple factors: font-family and size of the individual characters within a block and character case for the block as a whole. Historically, font-size did not differ between font-families; it was the descender-to-ascender height of metal-cast letters. For digital fonts, however, font-size blends with other characteristics to create the way letters appear on screen or in print. In digital fonts, characters of different font-families rendered at the same point size often have distinct heights. For example, Arial and Courier New produce characters of different height when using the same font-size. This prevents the use of raw font-size as a proxy for perceived height. Therefore, given that font-size cannot be used directly to calculate perceived height of a block, an alternative approach is used to compute the average height of all characters in a block to produce the perceived height according to an embodiment.

Figure 5:
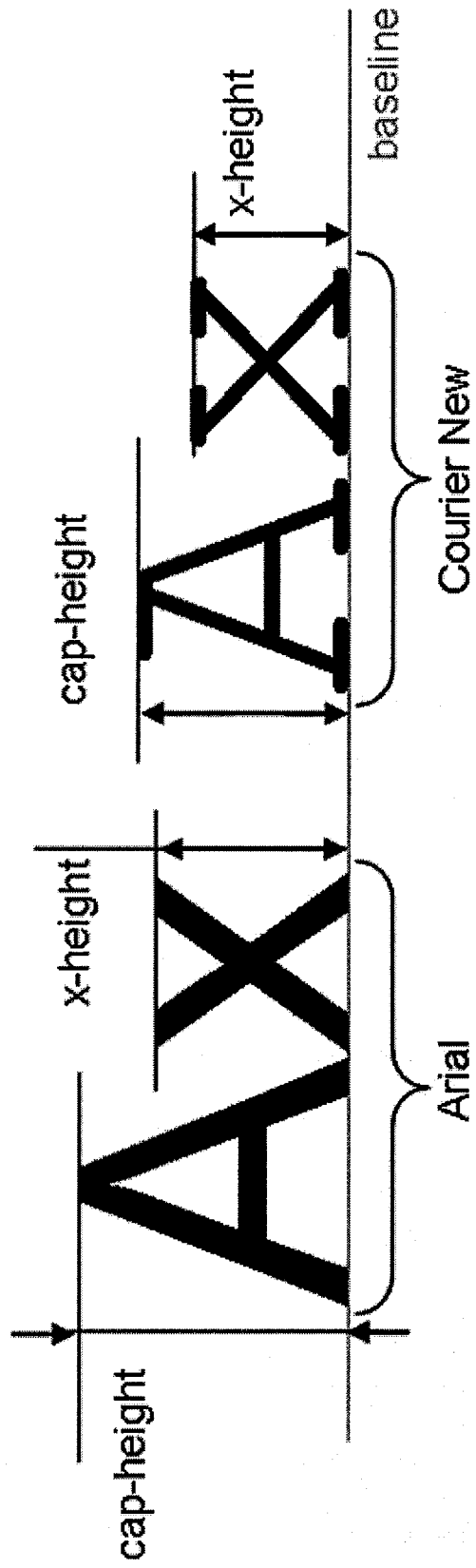
FIG. 5 is a schematic representation of the relative sizes and heights of two portions of text in different fonts.

To evaluate perceptual height we refer back to the foundations of typography. A base-line is an imaginary line which all non-descendant characters 'sit' upon. To achieve the required optical alignment some characters are drawn touching the baseline, whilst others descend below it. Two characters of the same_font type, style, variant can therefore have different heights; the letter O is especially designed to protrude below the baseline for example. The perceived body height of lowercase characters aligns optically at the x-height, where x-height is the height of a lowercase x character, as shown in FIG. 5.

This means ascenders and occasional capitals in sentence and title cased text do not contribute to the perceived height of the text block. Instead these features add to the block's outer shape to aid legibility, see for example FIG. 6a.

Figures 6A, 6B, 6C:
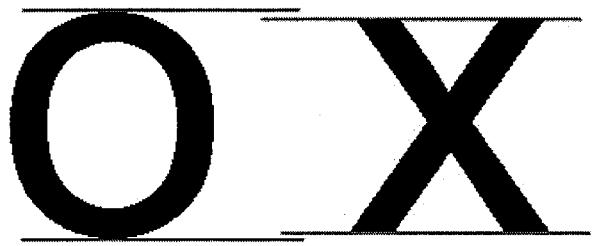
FIG. 6a is a schematic representation of the alignment of two different characters from the same font family which depicts the difference in alignment between characters.
FIG. 6b is a schematic representation of the difference in the perceived size of two different fonts of the same font size.
FIG. 6c is a schematic representation of the difference in perceived size between two different fonts at different capitalizations.

For any given font-size, fonts having a larger x-height appear larger than those with smaller x-heights, as illustrated in FIG. 6b. Within the same font-family a larger font-size corresponds to a larger x-height. Between font families, however, fonts of the same font-size feature different x-heights, and so perceived heights. It is important to take account of the character case of a text block when determining its perceived height, because the perceived height changes when all-capitals case is used. The tops of capital letters align optically along the capline, an imaginary line drawn across the top of the capital letter. Further, perceptual height in this case is given by cap-height, the distance between base- and capline, shown in FIG. 5.

When cap-height is identical to x-height, a block set in all-capitals appears smaller than a corresponding mixed-case block, as illustrated in FIG. 6c. Cap-height, therefore, should be adjusted accordingly to accommodate this effect. This leads to two conclusions, one for lower-, sentence and title case text, and the second for all-capital case text:

1. For mixed-case text blocks, a larger x-height corresponds to a larger perceived height and so a higher position in the document's visual hierarchy;
2. For all-capital text blocks, the cap-height is the important measure when calculating perceived font size.

A second factor in asserting a dominant position for a block of text is the use of a different character weight for the block. Font weight can be defined as the ratio between the width of a character's stroke and its height. Most type families consist of four weights: light, regular, medium and bold. For determining hierarchical ordering, the trend is relatively simple: a wider stroke produces more dominant text, for a given font-family and size. Bold text is used in two primary cases, as follows: Firstly, unlike larger font sizes, bold can be used to emphasize elements 'in-line': it can be mixed with normal text of the same size without breaking the optical lines described above. The effect of in-line emphasis cannot be achieved using larger fonts.

When a bold (or other different font-weight) is used for in-line emphasis and is detected according to an embodiment such that the bold (for example) font is adjacent to at least one text block with its style property differing by weight, then it is assumed that the bold font is being used to create in-line emphasis.

Secondly, font-weight variation is often used in headings. Bold is used to compensate for a relatively small increase in x-height between adjacent headings of different levels or between a heading and its following text. In this case the block is likely to be surrounded by line breaks and neighboring text blocks with distinct properties; this can be used as a heuristic to detect when bold has been used to signify a heading rather than in-line emphasis. These two cases need to be differentiated to ensure a property describing in-line emphasised text is not mapped to an inappropriate property during repurposing, such as a heading style.

Accordingly, hierarchical score depends on a text block's x-height and the weight of its characters. In order to determine a correlation between these factors, there are two edge cases that are first considered:

for the same x-height, the block with wider stroke dominates;
for the same stroke width, the block with larger x-height dominates.

Figure 7A:
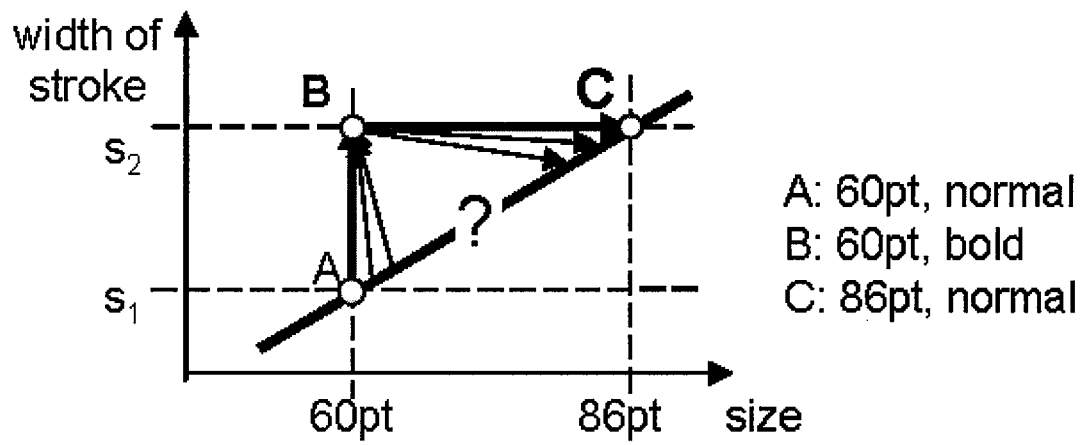
FIG. 7a is a diagram representing a difference in the width of a stroke for the same font-size (A and B), but different weights: A normal, B bold; and the same width of a stroke B and C.

Referring to FIG. 7a, this relation holds in some area surrounding these points as shown in the figure. According to the continuity principle, there will be an equilibrium point where the greater weight is canceled out by a greater x-height; the height will decide which block dominates. More formally, there should be a point or interval on the line AC, with the hierarchical score equal to hierarchical score of point B.

Given the cost of calculating the equilibrium point for all required combinations in a given document, it would make sense to look for alternative methods of determining hierarchical scores. In both these contexts, a heuristic approach can be applied which is described below. To see this, the two contexts where extra weight is used are restated:

in headings, where the entire block is set in bold;
inside a bulk of text with immediate neighbors of different weight, but with otherwise identical characteristics.

In body text, use of bold is in-line and therefore below any heading in terms of the visual hierarchy of the document. When used in-line, bold text blocks will share all property characteristics aside from font-weight with surrounding blocks. This means that the two properties, that of 'body text' and 'body text+bold', can be carried through the transformation together, preserving the relationship between 'body text' blocks and 'body text+bold' blocks. This is in-line with the requirement that similar properties are mapped in the source document to properties similar to each other in the target document.

If the second case, when bold is used in headings, order of appearance can be used to infer hierarchy; more important headings will appear before lower-level headings. This can be expanded more generally: for the first appearance of two parametrically competing headings of text, in the absence of dominant properties, hierarchical order can be assigned in order of the blocks' appearance. So instead of requiring a combinational method to decide the hierarchical score when considering competing x-height and weights, we can use the above intuitive methods.

The problem of document repurposing in perceptual space becomes the problem of monotonic mapping between two linearly ordered sets: the property hierarchical scores of two documents. The mapping should be established for every unique property from the first document to be repurposed. No two properties from the first document should map into the same property of the second document (unless in the special case that there is a strict style—i.e. a style which must be adhered to—for the second document which has an insufficient number of properties).

The steps above generated an ordered list of hierarchical scores for the properties of the first document to give a domain. Providing a second ordered list for a second document provides a range. Different strategies can be deployed to establish the mapping M. In the simplest case, if the number of different properties in Range and Domain are equal, then direct mapping can be used: ith property in the Domain to ith property in the Range. However, this mapping cannot be used if either document does not contain a complete representation of its style or the quantity of properties in the Domain and Range differ. For example, if two documents have styles perceptually appearing as headings and body text as follows:

Document1: heading1(1), heading3(1), body(1)
Document2: heading1(2), heading2(2), heading3(2), body(2)

then sequential mapping of these properties may result in
heading1(1)→heading1(2)
heading3(1)→heading2(2)
body(1)→heading3(2)

meaning if, for example, heading3(2) is bold, then the entire body of the first document will be mistakenly set in bold.

Figure 7B:
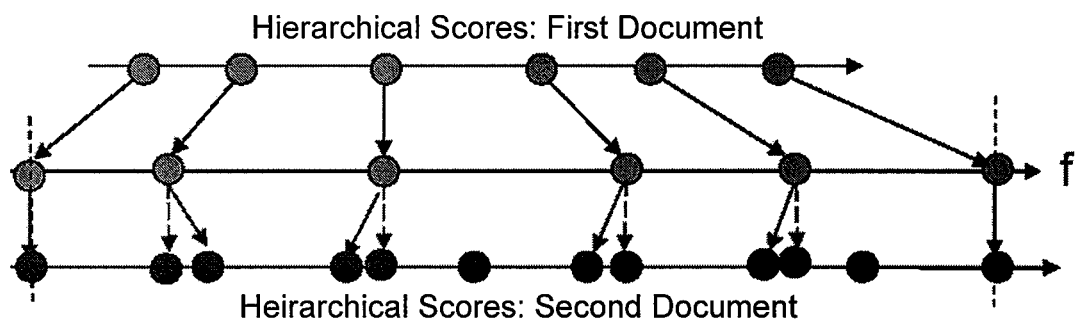
FIG. 7b is a schematic representation of a linear mapping of properties according to an embodiment between a first document defining a domain and a second document defining a range.

Using a linear transform provides an intuitive initial mapping which adheres well to the repurposing requirements stated earlier by preserving visual order and proportionality. Linear transformation is also likely to overcome the problem described above. The transformation brings the Domain and Range values into the same scale, as shown in FIG. 7b, whilst preserving perceptual order and proportionality between each property from the Domain.

Let minimal $h_m$ and maximal $h_M$ perceptual values for both documents be given by:

$$h_m^{(i)} = \min_k(H_k^{(i)})$$

$$h_M^{(i)} = \max_k(H_k^{(i)})$$

then the simplest transformation f(H) preserving order and proportionality is the linear mapping:

$$f(H) = h_m^{(2)} + \frac{h_M^{(2)} - h_m^{(2)}}{h_M^{(1)} - h_m^{(1)}}(H - h_m^{(1)}) \quad \text{Eqn. (2)}$$

The basic model is reliant on the minimum and maximum points being mapped correctly in the transformation between the first and second documents. This means special care needs to be taken to ensure a correct mapping by using structure-based heuristics. For each hierarchical score in the first document the corresponding hierarchical score from the range, provided by the second document is established. However, the newly computed hierarchical metrics might not exactly match the metrics from the style to be applied to the first document. Next, we need to reflect the newly computed hierarchical scores into the actual properties $p^{(2)}$ of the second document.

As a result of the linear mapping, hierarchical scores of both documents are now on the same scale. According to an embodiment, a one-dimensional Nearest Neighbor Search, or similar, can be used to establish the correspondence between $f_k$ and the nearest $H_j^{(2)}$ preserved order whilst aiming to maintain proportionality to a certain degree.

Given transformed scores of the first and second documents, a correspondence can be established using different strategies depending on types of documents. For example:
select the nearest
if there is double booking, shift minimizing total error $$f_k \rightarrow \begin{cases} H_j^{(2)} & \text{if } |f_k - H_j^{(2)}| \le |f_k - H_{j+1}^{(2)}|, \\ H_{j+1}^{(2)}, & \text{otherwise} \end{cases}$$

Figure 7C:
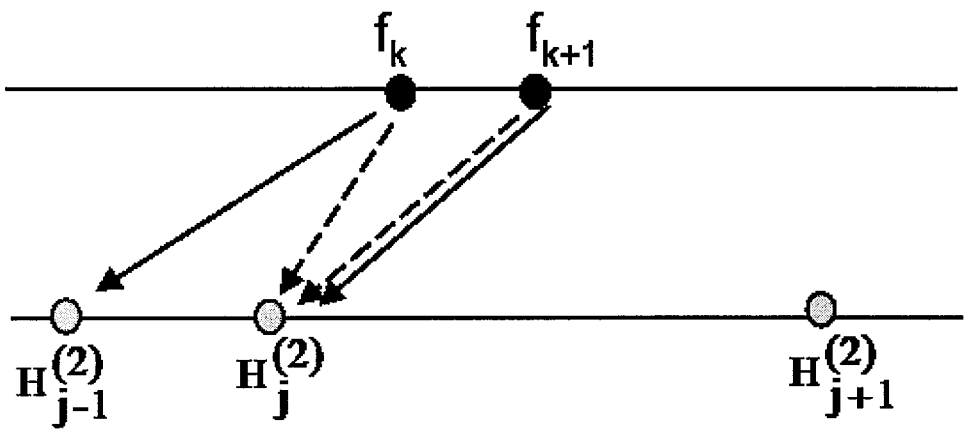
FIG. 7c is a schematic representation of a mapping according to a strict style.

When mapping for every $f_k$ is established, a check is performed to determine if there are no two different $f_k$-s that both mapped into the same $H^{(2)}_j$ as for example shown in FIG. 7c by dashed arrows. If there are, then all mappings starting from the repeating 'point' are shifted to the left or to the right, whichever gives the smallest total error. Depending on the 'strictness' of the style being applied to the content of the first document, that is to say whether the style can tolerate minor modifications—there are two strategies schematically shown in FIG. 7b, where the exact properties of the second document should be used for a strict style, and some derived properties may be used for a non-strict style.

This is the final stage in establishing mapping between sets of properties $P^{(1)}$ of a first document and $P^{(2)}$ a second document. The next step is to update the corresponding properties of text blocks $B^{(1)}$. Each homogeneous text block $B^{(1)}_j$ from the partition is described by the newly assigned property $P^{(2)}_j$ from the style to be applied. Due to these modifications the original positions of text blocks $B^{(1)}_j$ can no longer be used and the first document must be reflowed: characters, line breaks and graphic content need repositioning. The Document Description Framework (DDF) platform as described in J. Lumley, R. Gimson, and O. Rees, A framework for structure, layout & function in documents, In DocEng '05: Proceedings of the 2005 ACM symposium on Document engineering, pages 32-41, New York, N.Y., USA, 2005, the contents of which are incorporated herein by reference can be used to reflow the document. A flow-based document can be presented as a spatially ordered sequence of text blocks $B^{(1)}_j$ periodically interrupted by graphic content, line breaks or both. By spatial ordering we mean the position of each $B^{(i)}_j$ on a page is fully defined by the position of its predecessor $B^{(i)}_{j-1}$. If there are no graphics or line breaks after $B^{(i)}_{j-1}$, then $B^{(i)}_j$ is placed immediately after $B^{(i)}_j$, otherwise corresponding graphics and line breaks are placed, followed by $B^{(i)}_j$.

The linear model can be further improved by using spatial relationships between different elements and frequency analysis:

spatial relations and character counts of text blocks $B^{(i)}_j$ and properties $P^{(i)}_k$ Heuristic 1. [Size of titles] At each level, headings are generally a set of low-frequency spatially disjoined fragments: a heading can be a few lines at most, but generally consists of only a few words. The mapping used should ensure titles and subtitles (that are of low frequency) are mapped into low frequency sequential properties.

Heuristic 2. [Font frequency property] The most frequently occurring property $P^{(i)}_q$ is likely to be attributed to the main body of both the first and second documents.

relative locations, order of appearance

Heuristic 3. [Header, footer, footnote] Headers and footers are usually rendered in the smallest fonts and occupy the header (top) and footer (bottom) areas of a page.

Heuristic 4. [Natural hierarchical order] The hierarchically higher heading appears in a document prior to any subordinate heading in its first occurrence.

any partial structural information available (for example, tables or lists) Heuristic 5. [Partial structural information] If some partial structural information is available in both documents, the corresponding properties should be mapped. However, if such information is only available in the second document, whose styling is reused, then such information may be ignored.

any past user decisions in current, or similar, situations should be recorded for future reuse—'learned'.

After applying these heuristics, it is likely the basic linear model will have been interrupted because the heuristics will have required some points in perceptual space to have been mapped onto heuristically defined corresponding points, rather than those defined by the linear model. For example, according to Heuristic 2, fonts of the main body of the second document are applied to the corresponding part of the first document.

If there is no corresponding element in the first document (such as a footer or table), but there is in the second then nothing in the first document should be mapped in to the corresponding properties of the second document. That is to say, for example, that something should not be created which looks like a footer, if the first document contains no footer. For example, if a footer is not present in the first document, the corresponding footer formatting according to the style to be applied should not be used. In this particular case, the lowest point in the range is not used by a linear or piecewise linear model.

Once all fixed points have been established, they serve as the vertices $V^{(n)} = \{P^{(1)}_j, P^{(2)}_k\}$ of the piecewise linear transformation for the remaining properties. The equation for each linear segment of this mapping is given by Eqn. 2 above where coordinates of fixed points are used instead of end points $h^{(i)}_m$ and $h^{(i)}_M$ accordingly.

Requiring the mapping provided by the piecewise linear transformation remains injective implies that the sequence of all heuristically established correspondences must satisfy the following monotonicity condition:

$$\text{For all } n: V^{(n-1)}_x < V^{(n)}_x, V^{(n-1)}_y < V^{(n)}_y$$

If this condition cannot be met, then any 'double booked' properties and 'reverse order' fragments are to be verified by the user.

Figure 8:
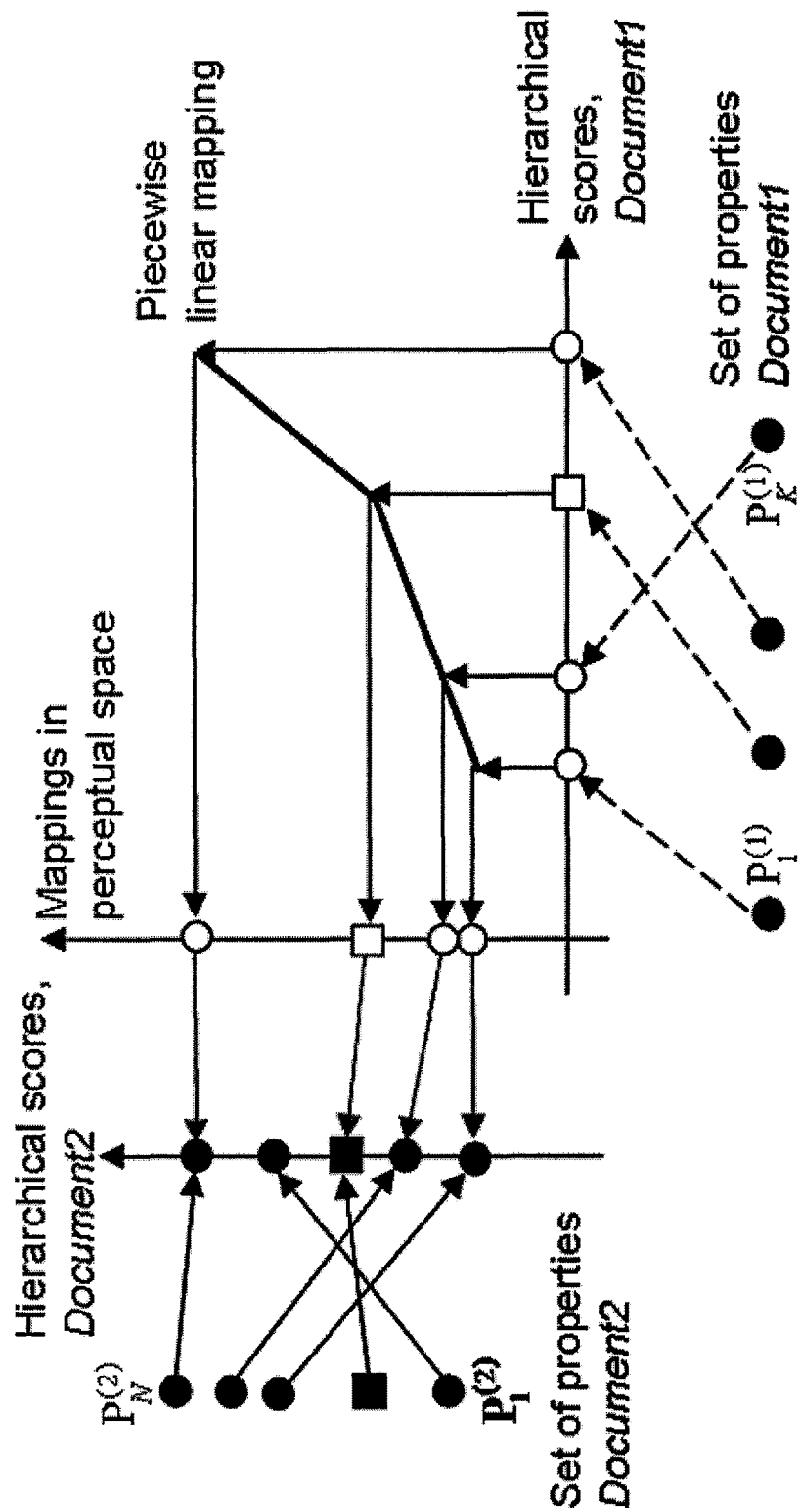
FIG. 8 is a schematic representation of a piecewise mapping in presence of partial structure or frequency analysis according to an embodiment.

An example of a piecewise linear mapping is shown in FIG. 8, where the point marked by a square corresponds to the body fonts in both documents. Other available cues that are taken into consideration are alignment, indentation, margins and paragraph spacing associated with the relevant properties in both documents.

Accordingly, it will be appreciated that the system repurposes documents using a set of rules in order to transform content and visual characteristics of an original document onto a repurposed document such that certain criteria are fulfilled and certain aesthetic rules are satisfied. The rules require that certain general characteristics of the original document to be repurposed are preserved so that these characteristics are recognisable in the repurposed document.

It will be appreciated that a document can be repurposed using a plurality of styles, as opposed to a single style. For example, different content items of a document can be respectively repurposed using different styles in order to provide a repurposed document which is a 'mash-up'—that is to say, a document comprising a plurality of differently (and perhaps visually incompatible) applied styles.

Figure 9:
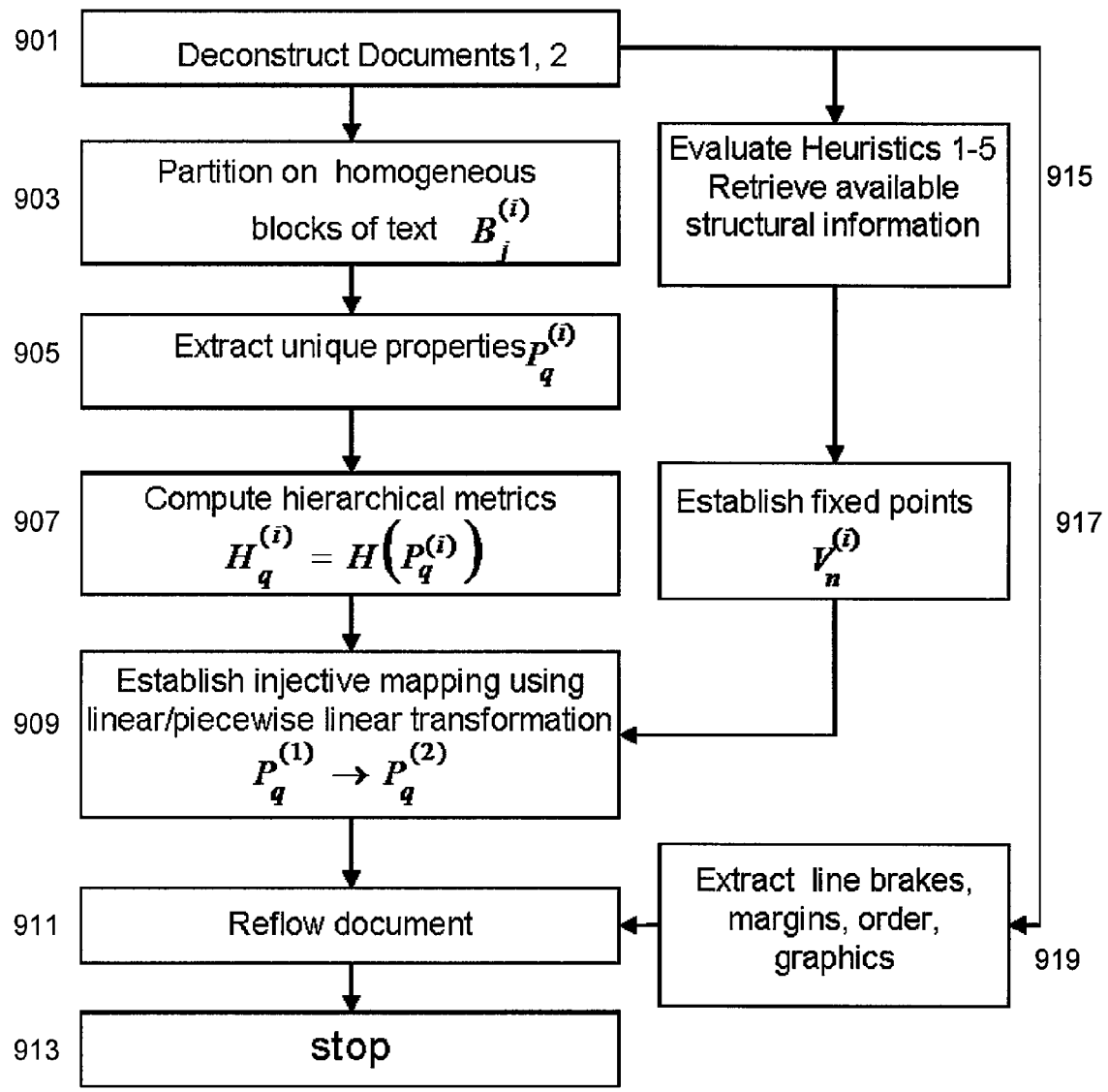
FIG. 9 is a flow chart of an implementation according to an embodiment.

It will also be appreciated that the style used to reflow a document need not be a known entity, but can be determined using another document. For example, and referring to FIG. 9 which is a flow diagram of an implementation according to an embodiment, a document to be repurposed, Document1, can have a style applied to it which is determined using the implementation described above from another document, Document2. Accordingly, at step 901, a document to be repurposed Document1, and a document whose style is to be used to repurpose Document1, denoted by Document2, are deconstructed such that blocks of text within the documents which comprise characters with the same properties are determined.

At 903, the documents are partitioned into homogenous blocks of text $B^{(i)}_j$. An example of a partitioned document is shown schematically in FIG. 3. The unique properties of the documents are extracted in step 905, and hierarchical metrics are calculated for the properties at step 907 as described above.

At step 909, a mapping is established between the sets of properties for the documents, which mapping is adapted to transform the content of Document1 using the style of Document2. More specifically, an injective mapping is established, if possible, using a linear or piecewise-linear transformation. An injective mapping is appropriate in the case that the number of unique properties from Document1 equals or is less than the number of unique properties extracted from Document2. In the case that the number of properties from Document1 exceeds the number from Document2, then according to an embodiment, some additional properties from the style used for the repurposing can be generated in order to maintain an injective mapping. In the case that the style used for the repurposing is a strict style, in the sense that it is not possible to validly or easily create new properties, properties can be merged. The merging of properties is least desirable mechanism to ensure a valid mapping.

At step 911 Document1 is repurposed/reflowed according to the extracted style from Document2 subject to the extraction and inclusion of any line breaks, margins, order and graphical objects at step 919. At the point at which the documents are deconstructed, the axioms described above can be evaluated at step 915. Accordingly, fixed points within the document to be repurposed are determined at step 917, and the fixed points are used in the determination of the mapping at step 909.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims below.

What is claimed is:

1. A method executed by a computer of generating a repurposed document comprising:
   accessing a first document with no explicitly defined structure;
   extracting structural information for the first document using a set of predefined rules;
   determining, using the extracted structural information, a first content item of the first document, the first content item having a first style;
   mapping the first style to a second style of a second document using a monotonic function of visual hierarchical scores of properties of the first document and visual hierarchical scores of properties of the second document;
   applying the second style to the first content item in order to generate a second content item; and
   generating the repurposed document using the second content item.

2. The method of claim 1, wherein the first content item is a homogeneous, sequential, non-intersecting block of characters within the first document which share the same properties of font family, size, and variant.

3. The method of claim 1, further comprising generating a list of distinct, non-repetitive combinations of properties of characters within the first document.

4. The method of claim 1, further comprising determining a measure representative of the visual hierarchical score of a character within the first document.

5. The method of claim 2, wherein the properties of the block of characters in the first document are maintained in the repurposed document.

6. The method of claim 2, wherein a visual hierarchical score of characters within the block of characters within the first document is preserved in the repurposed document.

7. The method of claim 1, wherein the second document has no explicitly defined structure.

8. The method of claim 7, further comprising:
   defining a domain of properties of the first document, the domain comprising a set of ordered visual hierarchical scores for the set of properties of the first document;
   defining a range of properties for the second document, the range comprising a set of ordered visual hierarchical scores for the set of properties of the second document; and
   generating the monotonic function to map the properties in the domain to the properties in the range.

9. The method of claim 8, wherein the monotonic function is one of a linear or piecewise transformation, and wherein mapping the first style to the second style comprises:

matching a property in the domain with a property in the range according to a relative disposition of the respective properties based on the visual hierarchical scores of the properties in the domain and the visual significance scores of the properties in the range.

10. The method of claim 9, further comprising adjusting the monotonic function in order to provide a more accurate match for a mapping of a property in the domain to a property in the range.

11. A computer comprising:

a processor; and a memory storing machine readable instructions executable by the processor to generate a repurposed document, the machine readable instructions comprising code to:

access a first document with no explicitly defined structure;

extract structural information for the first document using a set of predefined rules;

determine, using the extracted structural information, a first content item of the first document, the first content item having a first style;

map the first style to a second style of a second document using a monotonic function of visual hierarchical scores of style properties of the first document and visual hierarchical scores of style properties of the second document;

apply the second style to the first content item in order to generate a second content item; and generate the repurposed document using the second content item.

12. An article comprising at least one non-transitory computer-readable storage medium containing instructions that when executed cause a computer to:

access a first document with no explicitly defined structure;

extract structural information for the first document using a set of predefined rules;

determine, using the extracted structural information, a first content item of the first document, the first content item having a first style;

map the first style to a second style of a second document using a monotonic function of visual hierarchical scores of properties of the first document and visual hierarchical scores of properties of the second document;

apply the second style to the first content item in order to generate a second content item; and generate the repurposed document using the second content item.

13. The method of claim 1, wherein generating the repurposed document preserves a relationship between two or more blocks of characters within the first document based on a difference in a level of importance between the blocks, wherein the level of importance of each block is based on a height of each block determined by computing an average height of all characters in the block.

14. The computer of claim 11, wherein the code to generate the repurposed document preserves a relationship between two or more blocks of characters within the first document based on a difference in a level of importance between the blocks, wherein the level of importance of each block is based on a height of each block determined by computing an average height of all characters in the block.

15. The article of claim 12, wherein the instructions to cause the computer to generate the repurposed document preserves a relationship between two or more blocks of characters within the first document based on a difference in a level of importance between the blocks, wherein the level of importance of each block is based on a height of each block determined by a computation of an average height of all characters in the block.

* * * * *